United States Patent
Amanullah et al.

(10) Patent No.: US 10,988,667 B2
(45) Date of Patent: Apr. 27, 2021

(54) PERMEABLE AND DECOMPOSABLE PLUG FORMING RAPIDLY DEHYDRATING FLUID (RDF)

(71) Applicant: Saudi Arabian Oil Company, Dhahran (SA)

(72) Inventors: Md Amanullah, Dhahran (SA); Ali Radhwan, Anak (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/803,457

(22) Filed: Feb. 27, 2020

(65) Prior Publication Data
US 2020/0317988 A1    Oct. 8, 2020

Related U.S. Application Data

(62) Division of application No. 16/374,938, filed on Apr. 4, 2019.

(51) Int. Cl.
| | | |
|---|---|---|
| *E21B 33/138* | (2006.01) | |
| *C09K 8/514* | (2006.01) | |
| *E21B 21/00* | (2006.01) | |

(52) U.S. Cl.
CPC ............ *C09K 8/514* (2013.01); *E21B 21/003* (2013.01); *E21B 33/138* (2013.01); *C09K 2208/04* (2013.01); *C09K 2208/08* (2013.01)

(58) Field of Classification Search
None
See application file for complete search history.

(56) References Cited

U.S. PATENT DOCUMENTS

| | | |
|---|---|---|
| 6,790,812 B2 | 9/2004 | Halliday et al. |
| 9,957,433 B2 | 5/2018 | Amanullah et al. |
| 10,023,781 B2 | 7/2018 | Amanullah |

(Continued)

FOREIGN PATENT DOCUMENTS

| | | |
|---|---|---|
| WO | 2010088484 A2 | 8/2010 |
| WO | 2010142370 A1 | 12/2010 |

(Continued)

OTHER PUBLICATIONS

Amanullah, Md. et al.; "Date Seed-Based Particulate LCM "ARC Plug"—Its Developement, Laboratory Testing and Trial Test Results" SPE-187988-MS, SPE Kingdom of Saudi Arabia Symposium and Exhibition, Apr. 24-27, 2017; pp. 1-13.

(Continued)

*Primary Examiner* — Charles R Nold
(74) *Attorney, Agent, or Firm* — Bracewell LLP; Constance G. Rhebergen; Brian H. Tompkins

(57) ABSTRACT

A rapidly dehydrating fluid (RDF) composition that forms a permeable and decomposable plug and methods of lost circulation control and manufacture of the RDF composition. The RDF composition may include a carrier fluid such as water, a cellulosic microfiber viscosifier, date tree seed particles, and fibers formed from date tree waste such as date tree trunks. The RDF composition may mitigate or prevent lost circulation by forming a decomposable plug in a fracture of the lost circulation zone and may also enable the production of hydrocarbons from the zone without removal of the plug.

2 Claims, 2 Drawing Sheets

(56) References Cited

U.S. PATENT DOCUMENTS

| | | |
|---|---|---|
| 10,087,353 B2 | 10/2018 | Amanullah |
| 10,240,411 B1 | 3/2019 | Amanullah |
| 10,259,982 B2 | 4/2019 | Amanullah |
| 10,336,930 B2 | 7/2019 | Amanullah |
| 10,352,116 B2 | 7/2019 | Amanullah |
| 10,414,965 B2 | 9/2019 | Amanullah |
| 10,479,920 B2 | 11/2019 | Amanullah et al. |
| 10,611,943 B2 | 4/2020 | Amanullah |
| 2009/0054269 A1 | 2/2009 | Chatterji et al. |
| 2012/0264659 A1 | 10/2012 | Kulkarni et al. |
| 2013/0075089 A1 | 3/2013 | Bour et al. |
| 2016/0312100 A1 | 10/2016 | Amanullah et al. |
| 2017/0058180 A1 | 3/2017 | Hossain et al. |
| 2017/0158941 A1 | 6/2017 | Grinrod |
| 2017/0298263 A1 | 10/2017 | Amanullah |
| 2018/0002589 A1 | 1/2018 | Amanullah |
| 2018/0057729 A1* | 3/2018 | Amanullah ............ D21B 1/063 |
| 2018/0201819 A1 | 7/2018 | Amanullah |
| 2018/0340109 A1 | 11/2018 | Amanullah |
| 2019/0177593 A1 | 6/2019 | Amanullah |
| 2019/0177594 A1 | 6/2019 | Amanullah |
| 2019/0177595 A1 | 6/2019 | Amanullah |
| 2019/0177596 A1 | 6/2019 | Amanullah |
| 2019/0177597 A1 | 6/2019 | Amanullah |
| 2019/0177598 A1 | 6/2019 | Amanullah |
| 2019/0185731 A1 | 6/2019 | Amanullah |
| 2019/0185732 A1 | 6/2019 | Amanullah |
| 2019/0218869 A1 | 7/2019 | Amanullah |
| 2019/0218870 A1 | 7/2019 | Amanullah |
| 2019/0218871 A1 | 7/2019 | Amanullah |
| 2019/0233705 A1 | 8/2019 | Amanullah et al. |
| 2019/0270924 A1 | 9/2019 | Amanullah |
| 2019/0300773 A1 | 10/2019 | Amanullah et al. |
| 2020/0002592 A1 | 1/2020 | Amanullah |

FOREIGN PATENT DOCUMENTS

| | | |
|---|---|---|
| WO | 2018005575 A1 | 1/2018 |
| WO | 2018013619 A1 | 1/2018 |
| WO | 2018044612 A1 | 3/2018 |
| WO | 2018106874 A1 | 6/2018 |

OTHER PUBLICATIONS

Amanullah, Md; "Characteristics, Behavior and Performance of ARC Plug—A Date Seed-Based Sized Particulate LCM" SPE-182840-MS, Kingdom of Saudi Arabia Annual Technical Symposium & Exhibition, Apr. 25-28, 2018; pp. 1-9.

Ramasamy, Jothibasu et al.; "A Novel Superfine Fibrous Lost Circulation Material derived from Date Tree for Seepage Loss Control" SPE-192229-MS, SPE Kingdom of Saudi Arabia Annual Technical Symposium & Exhibition, Apr. 23-26, 2018; pp. 1-6.

Ramasamy, Jothibasu et al.; "Two Component Lost Circulation Material for Controlling Seepage to Moderate Losses" SPE-188101-MS, SPE Kingdom of Saudi Arabia Annual Technical Symposium & Exhibition, Apr. 24-27, 2017; pp. 1-10.

International Search Report and Written Opinion for International Application No. PCT/US2018/061006 dated Jan. 18, 2019; pp. 1-17.

International Search Report and Written Opinion for International Application No. PCT/US2020/025763 dated Jul. 13, 2020; pp. 1-14.

Kefi et al., "Optimizing in Four Steps Composite Lost-Circulation Pills Without Knowing Loss Zone Width", IADC/SPE 133735, Asia Pacific Drilling Technology Conference & Exhibition, 2010, pp. 1-14.

* cited by examiner

PERMEABLE AND DECOMPOSABLE PLUG FORMING RAPIDLY DEHYDRATING FLUID (RDF)

CROSS-REFERENCE TO RELATED APPLICATIONS

This application is a divisional of and claims priority from U.S. Non-provisional application Ser. No. 16/374,938 filed Apr. 4, 2019, and titled "PERMEABLE AND DECOMPOSABLE PLUG FORMING RAPIDLY DEHYDRATING FLUID (RDF)," a copy of which is incorporated by reference in its entirety for purposes of United States patent practice.

BACKGROUND

Field of the Disclosure

The present disclosure generally relates to controlling lost circulation in a wellbore during drilling with a drilling fluid. More specifically, embodiments of the disclosure relate to a rapidly dehydrating fluid (RDF).

Description of the Related Art

Lost circulation is one of the frequent challenges encountered during drilling operations. Lost circulation can be encountered during any stage of operations and occurs when some or all of the drilling fluid (which may include drilling mud) pumped into a well does not return to the surface. While a de minimis amount of fluid loss is expected, excessive fluid loss is not desirable from a safety, economical, or environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in different formations such as naturally fractured formations and cavernous formations. Lost circulation may also occur in weak formations due to the creation of induced fractures. Lost circulation may happen in any other formations if a thief or loss zone is available for the drilling fluid to escape from the wellbore. Formations such as shale, sands, gravel, shell beds, reef deposits, limestone, dolomite, and chalk can cause seepage, moderate or severe drilling fluid losses depending on the nature of the loss zones. Lost circulation may also occur in the non-reservoir and the reservoir sections of a wellbore.

SUMMARY

Controlling loss of circulation in reservoir sections using conventional LCMs may cause permanent sealing and plugging of the permeable channels and fractures, thus preventing production of oil and gas resources through these permeable channels and fractures and impacting the ultimate productivity of the well and the field. Consequently, certain LCMs have been developed for use in reservoir sections. For example, LCMs that are acid soluble are typically used in reservoir sections.

An acid treatment is typically performed before completing a well to remove the plug formed by an acid-soluble LCM and ensure production through the conductive fracture channels. However, deep and long plugs formed in fractured loss zones may be difficult to treat using an acid due to the difficulties of acid placement and entry at a relatively large distance from the wellbore. As a result, the acid treatment may not restore production through these conductive fractures. Moreover, the acid treatment creates waste by-products that may cause more damage to near-wellbore pay zones due to their dispersion, precipitation, cementation and blockage of permeable channels.

As an alternative to solid and acid-soluble plugs, some existing developed LCMs may form permeable plugs in fractured loss zones to stop the loss of whole mud while drilling but allow the production of oil and gas from these fractured channels due to the permeable nature of the plugs. However, due to progressive fouling of the permeable plugs by the precipitations of solid particles, deposition of asphalt and oil slugs, creation of water and emulsion blockage, and other mechanisms, the production through the permeable plug matrix may be significantly reduced over time. In extreme cases, production through these conductive channels having the permeable plugs may cease completely. Although the permeable plugs ensure production from conductive channels immediately after the completion of a well, these existing techniques and LCMs may not provide a sustainable production from conductive channels due to the progressive fouling of the plugs.

Embodiments of the disclosure include a permeable- and decomposable-plug forming rapidly dehydrating fluid (RDF) for use as a lost circulation material (LCM). The RDF may mitigate or prevent such lost circulation in a well and prevent or reduce the loss of drilling mud while drilling. The plug formed by the RDF of the disclosure may enable hydrocarbon production through the plug matrix at the early stages of production. The plug formed by the RDF may degrade over a time period without the use of an acid to provide for increased hydrocarbon production through a conductive channel.

In some embodiments, a rapidly dehydrating fluid (RDF) composition is provided. The RDF composition includes a carrier fluid, a cellulosic viscosifier, a plurality of particles formed from date tree seeds, and a plurality of date tree trunk fibers, the date tree trunk fibers including fibers formed from date tree trunks. In some embodiments, the RDF composition consists of the carrier fluid, the cellulosic microfiber viscosifier, the plurality of particles formed from date tree seeds, and the plurality of date tree trunk fibers. In some embodiments, the carrier fluid is water. In some embodiments, the cellulosic viscosifier is an amount in the range of 7 weight % of the total weight (w/w %) of the composition to about 8 w/w %. In some embodiments, the plurality of particles formed from date tree seeds is an amount in the range of 4 weight % of the total weight (w/w %) to about 5 w/w %. In some embodiments, the plurality of date tree trunk fibers is an amount in the range of 3 weight % of the total weight (w/w %) to about 4 w/w %. In some embodiments, each of the plurality of particles formed from date tree seeds has a size in the range of 400 microns to 595 microns. In some embodiments, the RDF composition has a dehydration time of less than 2 minutes at 100 pounds-per-square inch differential (psid) pressure.

In another embodiments, a method control lost circulation in a loss zone in a wellbore is provided. The method includes introducing an rapidly dehydrating fluid (RDF) composition into the wellbore such that the rapidly dehydrating fluid (RDF) composition contacts the loss zone and reduces a rate of lost circulation into the loss zone. The RDF composition includes a carrier fluid, a cellulosic viscosifier, a plurality of particles formed from date tree seeds, and a plurality of date tree trunk fibers, the date tree trunk fibers including fibers formed from date tree trunks. In some embodiments, the RDF composition consists of the carrier fluid, the cellulosic microfiber viscosifier, the plurality of particles formed from date tree seeds, and the plurality of date tree trunk fibers. In some embodiments, the carrier fluid is water. In some embodiments, the cellulosic viscosifier is an amount in the range of 7 weight % of the total weight (w/w %) to about 8 w/w % In some embodiments, the plurality of particles formed from date tree seeds is an amount in the range of 4 weight % of the total weight (w/w %) to about 5 w/w %. In some embodiments, the plurality of date tree trunk fibers is an amount in the range of 3 weight % of the total weight (w/w %) to about 4 w/w %. In some embodiments, each of the plurality of particles formed from date tree seeds has a size in the range of 400 microns to 595 microns. In some embodiments, the RDF composition has a dehydration time of less than 2 minutes at 100 pounds-per-square inch differential (psid) pressure. In some embodiments, the method includes allowing a plug formed by the RDF to degrade over a time period.

In another embodiment, a method of manufacturing a rapidly dehydrating fluid (RDF) composition is provided. The method includes performing the following steps in order: 1) mixing a carrier fluid and a cellulosic microfiber viscosifier to form a mixture, 2) mixing a plurality of particles formed from date tree seeds into the mixture, each of the plurality of particles formed from date tree seeds has a size in the range of 400 microns to 595 microns, and 3) mixing a plurality of date tree trunk fibers into the mixture, the date tree trunk fibers including fibers formed from date tree trunks. In some embodiments, the carrier fluid is water. In some embodiments, the cellulosic viscosifier is an amount in the range of 7 weight % of the total weight (w/w %) to about 8 w/w % In some embodiments, the plurality of particles formed from date tree seeds is an amount in the range of 4 weight % of the total weight (w/w %) to about 5 w/w %. In some embodiments, the plurality of date tree trunk fibers is an amount in the range of 3 weight % of the total weight (w/w %) to about 4 w/w %.

DETAILED DESCRIPTION

Figure 1:
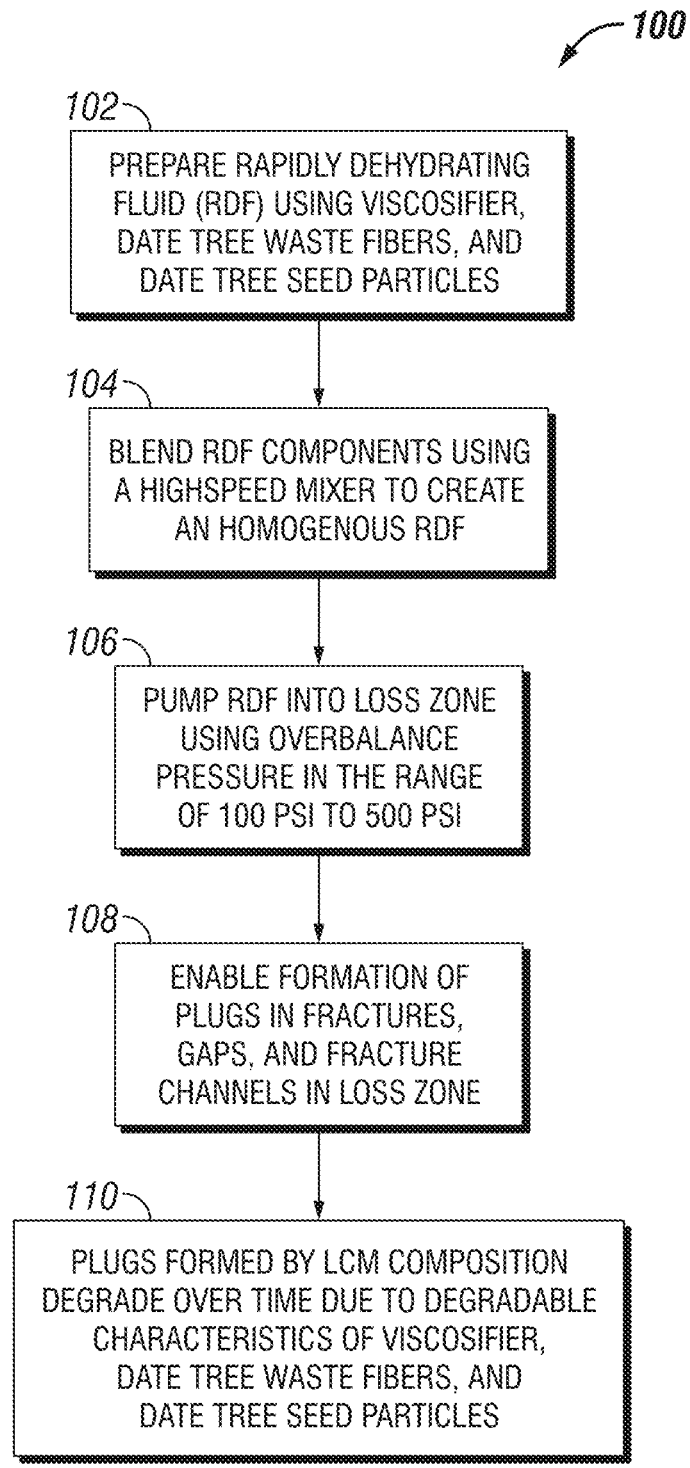
FIG. 1 is a block diagram of a process for preparing and using a rapidly dehydrating fluid (RDF) composition in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a permeable- and decomposable-plug forming rapidly dehydrating fluid (RDF) for use as a lost circulation material (LCM). The compositions described in the disclosure may thus be referred to as a "rapidly dehydrating LCM" or "rapidly dehydrating LCM composition." The rapidly dehydrating fluid may mitigate or prevent lost circulation in a well and prevent or reduce the loss of drilling mud while drilling. The rapidly dehydrating fluid compositions described in the disclosure may create a permeable and decomposable plug in a fracture of a formation to reduce or prevent the loss of drilling mud into the surrounding formation and enable production of hydrocarbons without removal of the plug (for example, via an acid treatment). The plug formed by the rapidly dehydrating fluid compositions described in the disclosure may have porosity-permeability ("poro-perm") characteristics similar to formation rock to provide for the infiltration of hydrocarbons through the plug matrix and enable production of hydrocarbons from the formation without removing the plug during the entire life cycle of a well. The plug may degrade over time without the use of an acid treatment or other chemicals introduced into the well. Further, the compositions described in this disclosure are eco-friendly, non-toxic, and environmentally safe such that the use of such compositions for lost circulation control have little to no detrimental effects on the subsurface environment and surrounding aquifers.

Additionally, the compositions described in this disclosure use raw materials that may be available locally and may encourage economic and job growth of local industries, such as the date farming industry. Further, the production of compositions from locally available raw materials may reduce or eliminate the costs associated with the importation and customs processing of conventional LCMs.

In some embodiments, a rapidly dehydrating fluid (RDF) composition (also referred to as a loss control slurry) may include a carrier fluid, a date tree waste fibers, date tree seed particles, and a viscosifier. The carrier fluid may include water. The viscosifier may include a suitable commercial viscosifier that can provide for rapid dehydration of the slurry at about 100 pounds-per-square inch differential (psid) to about 500 psid overbalance pressure.

The RDF composition may include date tree waste fibers (for example, date tree trunk fibers). The date tree waste fibers may have a size (that is, length) greater than 0 and less than 2000 microns. In some embodiments, the date seed particles may have the sieve sizing shown in Table 1.

TABLE 1

SIEVE SIZING OF DATE TREE WASTE FIBERS

| Average Percentage | Mesh No. | Size (in microns) |
|---|---|---|
| 4 ± 3% Retained | No. 18 Retained | >1000 (cut point <2000) |
| 20 ± 10% Retained | No. 30 Retained | 600-1000 |
| 52 ± 12% Retained | No. 60 Retained | 250-600 |
| 20 ± 10% Retained | No. 100 Retained | 150-250 |
| 4 ± 3% Retained | No. 100 Passing through | <150 |

In some embodiments, the RDF may include the date tree waste fibers in an amount of about 3 weight % of the total weight (w/w %) of the composition to about 4 w/w %. In some embodiments, the RDF composition may include the date tree waste fibers in an amount of about 3.5 w/w %.

The date tree waste fibers may be obtained from date tree waste, such as waste produced as a by-product from date processing, date tree pruning, or both. In some embodiments, the date tree waste may be obtained from date processing plants to provide sustainable source of particulate material. Moreover, local sources of date tree waste may reduce the cost of imported LCM products, components, or both. In some embodiments, the date tree waste may be obtained from the species *Phoenix dactylifera*. It should be appreciated that, in some embodiments, the date tree waste may be obtained from genetically modified date trees (that is, genetically modified organisms (GMOs)). In some embodiments, the date tree waste is date tree trunks, such that the RDF composition includes date tree trunk fibers. In some embodiments, the date tree trunks may be prepared by cleaning the date tree waste, such as by blowing air over the trunks to remove dust, rubbish, and other material, and then chopping, crushing, and grinding the trunks using an industrial grinder to produce date tree waste fibers. In some embodiments, the fibers may be sifted via one or more sieves to obtain a desired size of the fibrous material for use in the RDF composition described in the disclosure.

The RDF composition includes date tree seed particles formed from ground date tree seeds. The date tree seed particles may have a size (for example, diameter) in the range of about 400 microns to about 595 microns. In some embodiments, the RDF may include the date tree seed particles in an amount of about 4 w/w % to about 5 w/w %. In some embodiments, the RDF composition may include the date tree seed particles in an amount of about 4.8 w/w %.

In some embodiments, the date tree waste fibers may include untreated date tree waste fibers and the date seed particles may include untreated date seed particles, thus preserving the environmentally-friendly and biodegradable properties of the manufacturing process, the fibers, and the resulting composition. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the fibers or particles. In such embodiments, the date tree waste fibers and date tree seed particles may be manufactured without treating before, during, or after crushing, grinding, drying, or any other processing.

In some embodiments, the carrier fluid may be freshwater (water having relatively low (that is, less than 5000 parts-per-million (ppm)) concentrations of total dissolved solids (TDS)), seawater (for example, water having a salinity in the range of about 30,000 to about 40,000 ppm TDS), artificial brines, natural brines, brackish water, or formation water.

In some embodiments, the viscosifier may include a cellulosic microfiber derived from raw vegetable materials. In some embodiments, the RDF composition may include the cellulosic microfiber in an amount of about 7 w/w % to about 8 w/w %. In some embodiments, the RDF composition may include the cellulosic microfiber in an amount of about 7.2 w/w %. In some embodiments, the viscosifier may be a non-toxic viscosifier having cellulose in the range of about 5 w/w % to about 25 w/w % and water, and a pH in the range of about 3 to about 6. In some embodiments, the viscosifier may be Betafib® manufactured by Cosun Biobased Products of Roosendaal, Netherlands.

The RDF composition may be manufactured from a mixture by performing the following ordered steps (a) to (c):

(a) mixing water and the cellulosic viscosifier to form a mixture;

(b) mixing date seed particles into the mixture; and (c) mixing the date tree waste fibers into the mixture.

As used herein, the term "mixture" may include a mix of solids or solids and liquids.

The RDF composition may be formed by mixing the components in a high-speed mixer (for example, a commercial drilling fluid mixer) and forming a homogenous mixture, such as a homogenous slurry. In some embodiments, the RDF composition may be mixed for a time period (for example, in a range of about 1 minutes to about 5 minutes) after each step (a)-(c). In some embodiments the RDF composition may be produced without any additives or treatments, thus preserving the environmentally-friendly and biodegradable properties of both the manufacturing process and the RDF composition.

The rapidly dehydrating fluid includes components that are physically, chemically, thermally, and biologically degradable. The plug formed by the rapidly dehydrating fluid may degrade completely over a time period. In some embodiments, the plug formed by the rapidly dehydrating fluid may degrade completely (that is, such that no components are present in a formed plug) in about 28 days. As a result of the degradation, the components of the RDF may convert into carbon dioxide ($CO_2$), water, and residual fines. The residual fines may be easily transportable by the flow of hydrocarbon fluid during the production phase of a well. Thus, the residual fines may be washed away by flowing hydrocarbon fluid, resulting in the complete opening of the fractures plugged by the RDF composition and enhancement of the well productivity in the later stages of a well.

FIG. 1 depicts a process 100 for preparing and using a rapidly dehydrating fluid (RDF) composition in accordance with an embodiment of the disclosure. Initially, the RDF composition may be prepared from a cellulosic viscosifier, date tree seed particles, and date tree waste fibers (for example, date tree trunk fibers) (block 102). The RDF composition may be formed by blending the RDF using a high-speed mixture (for example, a commercial drilling fluid mixture) to create a homogenous RDF (block 104). For example, in some embodiments, the RDF composition may be formed by first mixing a carrier fluid (for example, water) and the cellulosic viscosifier to form a mixture, followed by mixing date seed particles into the mixture, followed by mixing the date tree waste fibers into the mixture, and mixing in a high-speed mixer (for example, a commercial drilling fluid mixture) to form a homogenous mixture. In some embodiments, the RDF composition may be mixed for a time period (for example, in a range of about 1 minutes to about 5 minutes) after each step and mixed for another time period after all components have been added. The RDF composition may form a pill (that is, a fluid pill formed of the RDF composition).

The RDF may be pumped into a loss zone using an overbalance pressure in the range of 100 psi to 500 psi. (block 106) In some embodiments, the RDF may be added to (for example, blended with) an oil-based drilling mud or a water-based drilling mud. In some embodiments, the RDF may be added at the mud pit of a mud system. After addition of the RDF, the drilling fluid having the RDF (that is, an altered drilling fluid) may be circulated at a pump rate effective to position the RDF into contact with a lost circulation zone in a wellbore. The placement of the RDF and the overbalance pressure may enable the formation of plugs in fractures, gaps, and channels in the loss zone (block 108). For example, in some embodiments the plugs may form in less than about 2 minutes at a pressure of about 100 psid. It should be appreciated that the time period for formation of the plugs may be also be based on the type of formation (for example, the size of the fractures and fracture channels in the formation).

The plugs formed by the RDF composition may be retained during the production phase of the well. Advantageously, the retention of the plugs avoids the use and introduction of acid (for example, hydrochloric acid) in the wellbore (referred to as "an acid treatment job"). Hydrocarbons may be produced from the loss zone having the permeable plugs such that the plugs prevent the loss of whole mud during the drilling phase do not need to be removed during the production phase. After a time period, the plugs may degrade over time due to the degradable characteristics of the cellulosic viscosifier, date tree waste fibers, and date tree seed particles (block 110). For example, the plugs may degrade in the later stages of production from the well, such that the fractures and fracture channels blocked by the plugs reopen after the plugs degrade. As noted in the disclosure, the eco-friendly, non-toxic, and environmentally friendly properties of the RDF composition may minimize or prevent any environmental impact, any effect on ecosystems, habitats, population, crops, and plants surrounding the drilling site where the RDF composition is used. Moreover, the elimination of the use of acid to remove the plugs and being production from the well further minimizes or prevents further environment impact on ecosystems, habitats, population, crops, and plants surrounding the drilling site

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However those of skill in the art should, in light of the present disclosure, appreciate that many changes can be made in the specific embodiments which are disclosed and still obtain a like or a similar result without departing from the spirit and scope of the disclosure.

The following non-limiting example of an RDF composition was prepared and evaluated to determine the rapidity of dehydration, the plug forming capabilities, and the permeability of the formed plug. Table 2 shows the formulation of the example RDF composition used in the tests, with the composition of the components provided in milliliters (ml) or grams (g), and also expressed as weight of the total weight (w/w %):

TABLE 2

EXAMPLE RDF FORMULATION FOR TESTING

| Component | Description | Amount |
| --- | --- | --- |
| Water (ml) | Carrier Fluid | 350 |
| Viscosifier (g) | Betafib ® | 15 (3.6 w/w %) |
| Particulate Material (g) | Ground date tree seeds | 20 (4.8 w/w %) |
| Fibrous Material (g) | Date Tree Waste Fibers | 30 (7.2 w/w %) |

As shown in Table 2, the example RDF formulation included a commercially available cellulosic microfiber viscosifier, Betafib®, manufactured by Cosun Biobased Products of Roosendaal, Netherlands.

A rapidly dehydrating fluid (RDF) formulation was prepared by mixing each component into a mixture using a high-speed mixer, in the order shown in Table 2: Betafib® was added to the carrier fluid in the mixture, followed by addition of date tree seed particles, followed by addition of the date tree waste fibers. The rapidity of dehydration of the RDF was evaluated according to the tests described infra.

Figure 2:
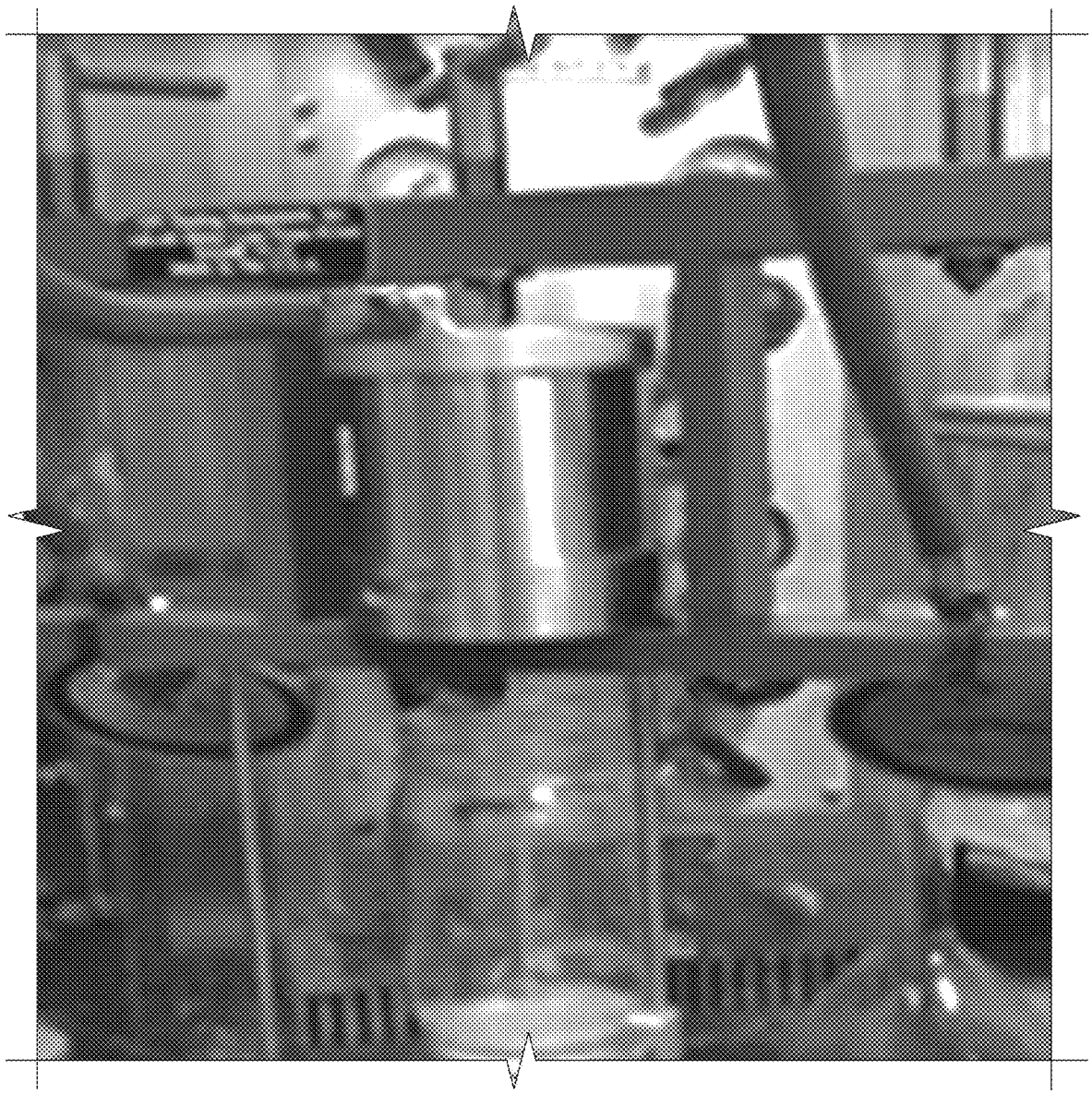
FIG. 2 is a photograph of an American Petroleum Society (API) filter press and API test cell in accordance with an embodiment of the disclosure.

The example formulation RDF was tested using a commercially available American Petroleum Society (API) filter press to simulate relatively large fractures bounded by a formation having a relatively low permeability. The API filter press includes a test cell to contain the sample undergoing testing. FIG. 2 is a photograph of the API filter press and API test cell in accordance with an embodiment of the disclosure.

The formulation was testing using the following dehydration test procedure:

1. Fill test cell of API filter press with a 350 cubic centimeter (cc) pill of the formulation;
2. Mount filtration cell to API filter press, affix the top lid, and connect a pressure line of nitrogen gas at about 100 psid pressure; and
3. Measure the dehydration time of the pill (that is, the time for the fluid (about 350 cc) to be removed) at room temperature and 100 psid pressure and collect discarded fluid (that is, expelled carrier fluid) in a fluid collection pot at the bottom outlet of the API test cell.

It was observed that a continuous stream of fluid existing the API test cell was visible. The continuous stream of fluid in contrast to a droplet-like or dripping flow was an indication of rapid dehydration of the example RDF.

The results of the dehydration tests are shown in Table 3. Three tests were conducted on the example formulation RDF. Table 3 shows the dehydration time measured in minutes (min) and the thickness of the plug formed by the dehydrated pill measured in mm:

TABLE 3

RESULTS OF DEHYDRATION TEST

| Test No | Test Parameter | Results |
| --- | --- | --- |
| Test 1 | Dehydration Time (min) | 1.15 |
|  | Permeable Plug Thickness (mm) | 40 |
| Test 2 | Dehydration Time (min) | 1.5 |
|  | Permeable Plug Thickness (mm) | 40 |
| Test 3 | Dehydration Time (min) | 1.5 |
|  | Permeable Plug Thickness (mm) | 41 |

As shown in Table 3, the example formulation RDF exhibited a dehydration time of less than 2 minutes. For commercial applications, a dehydration time of less than 4 minutes under 100 psid pressure indicates an RDF having greater than average performance. Thus, the example formulation RDF exceeded the industry accepted standard for rapid dehydration performance.

An oil flow test was also conducted at 100 psid to predict the hydrocarbon production capability of the plug. After the dehydration test procedure described supra and cessation of the fluid flow from the API test cell, the oil flow test was performed according to the following procedure:

1. Release the pressure and remove the top lid of the API test cell.
2. Pour about 200 cc of oil on top of the plug, affix the top lid, and connect the air pressure line of nitrogen gas at about 100 psid pressure; and
3. Collect the oil pushed through the plug matrix in a fluid collection pot at the bottom outlet of the API test cell.

The results of the dehydration tests are shown in Table 4. Three tests were conducted on the example formulation RDF. Table 3 shows the effluent time measured in minutes (min and the thickness of the deposited plug measured in millimeters (mm):

TABLE 4

RESULTS OF OIL FLOW TIME TEST

| Test No | Test Parameter | Oil Flow Test Results |
|---|---|---|
| Test 1 | Oil Flow Time (min) | 2.4 |
| | Perm Plug Thickness (mm) | 40 |
| Test 2 | Oil Flow Time (min) | 2.32 |
| | Perm Plug Thickness (mm) | 40 |
| Test 3 | Oil Flow Time (min) | 2.29 |
| | Perm Plug Thickness (mm) | 41 |

As shown in Table 4, in each test the oil flowed through the plug matrix in less than 3 minutes. This flow of the oil through the plug matrix under 100 psi pressure indicate the permeable nature of the plug formed by the example RDF formulation. Thus, the example RDF formulation demonstrated the ability to form dual functional permeable plugs having a first function of preventing the loss of whole mud while drilling and a second function of enabling hydrocarbon production from conductive fractures and permeable channels having the formed plugs.

Ranges may be expressed in the disclosure as from about one particular value to about another particular value or both. When such a range is expressed, it is to be understood that another embodiment is from the one particular value to the other particular value or both along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of manufacturing a rapidly dehydrating fluid (RDF) composition, comprising the steps (a) to (c) in the following order:
   (a) mixing a carrier fluid and a cellulosic viscosifier to form a mixture, wherein the cellulosic viscosifier is present in an amount of 3 weight % of the total weight (w/w%) to 4 w/w%;
   (b) mixing a plurality of particles formed from date tree seeds into the mixture, each of the plurality of particles formed from date tree seeds has a size of 400 microns to 595 microns,
   wherein the plurality of particles formed from date tree seeds are present in an amount of 4 weight % of the total weight (w/w%) to about 5 w/w%; and
   (c) mixing a plurality of date tree trunk fibers into the mixture, the date tree trunk fibers comprising fibers formed from date tree trunks,
   wherein the plurality of date tree trunk fibers are present in an amount of 7 weight % of the total weight (w/w%) to about 8 w/w%,
   wherein the RDF composition has a dehydration time of between 1.15 and 1.5 minutes at 100 pounds-per-square inch differential (psid) pressure.

2. The method of claim 1, wherein the carrier fluid comprises water.

* * * * *